Figure 1:
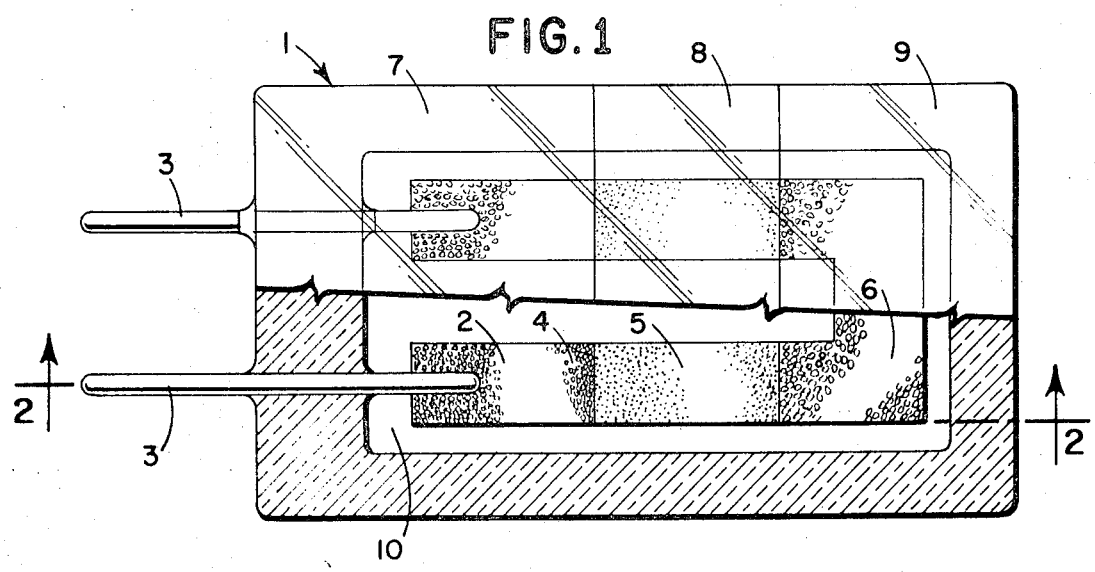

United States Patent

[11] 3,577,161

| [72] | Inventors | Martin Oberhofer<br>Taino;<br>Jurgen Jaspert, Cittiglio, Italy |
|---|---|---|
| [21] | Appl. No. | 689,098 |
| [22] | Filed | Dec. 8, 1967 |
| [45] | Patented | May 4, 1971 |
| [73] | Assignee | European Atomic Energy Community (Euratom)<br>Brussels, Belgium |
| [32] | Priority | Dec. 21, 1966 |
| [33] | | Netherlands |
| [31] | | 66/17951 |

[54] RADIATION DOSIMETER HAVING SENSITIVE MATERIAL CONTAINING LITHIUM HYDRIDE
10 Claims, 3 Drawing Figs.

[52] U.S. Cl............................................. 250/71,
250/83, 250/83.1

[51] Int. Cl.................................................. G01t 1/11,
G01t 3/00
[50] Field of Search............................................ 250/71, 83
(CD), 83.1

[56] References Cited
UNITED STATES PATENTS

| 3,141,973 | 7/1964 | Heins et al. .................. | 250/71 |
| 3,255,350 | 6/1966 | Fix .............................. | 250/71 |
| 3,376,416 | 4/1968 | Rutland et al. ............... | 250/71 |
| 3,399,301 | 8/1968 | Schayes et al. ............... | 250/71 |

*Primary Examiner*—Archie R. Borchelt
*Attorney*—Stevens, Davis, Miller and Mosher

ABSTRACT: A radiation dosimeter based on the phenomenon of thermoluminescence. The sensitive material in the dosimeter is, at least in part, lithium fluoride, and to the sensitive material is added lithium hydride.

PATENTED MAY 4 1971  3,577,161

INVENTORS
MARTIN OBERHOFFER,
JÜRGEN JASPERT

BY *Stevens, Davis, Miller & Mosher*
ATTORNEYS

RADIATION DOSIMETER HAVING SENSITIVE MATERIAL CONTAINING LITHIUM HYDRIDE

The invention relates to radiation dosimeters such as are carried by persons who come into contact with nuclear radiation. The radiation dosimeter according to the invention is based on the phenomenon of thermoluminescence. As already known, certain substances, such as lithium fluoride, have the property that they are activated by nuclear radiation, such as neutron radiation. If these substances are then heated subsequently, visible light is radiated. There is a linear relation between the radiation dose received and the quantity of radiated light.

Other known radiation dosimeters are based on the blackening of an X-ray film. These film dosimeters can show gamma radiation, and they can in practice also be made suitable for showing thermal neutrons by disposing a layer of cadmium on the film. Gamma radiation is produced by the irradiation of cadmium with neutrons, and this blackens the underlying X-ray film. For showing fast neutrons, nuclear track emulsions are used, in which the tracks of recoil protons produced by elastic collisions with the neutrons can be counted after the emulsion has been developed. By shielding the emulsion with a cadmium filter that retains the thermal neutrons, the emulsion can be made selective for fast neutrons alone.

The disadvantages of these dosimeters using X-ray or nuclear track films is that such films are no use for irradiation by both neutron and gamma radiation, since the gamma radiation is difficult to shield and the films are blackened to such an extent that neutron effects are no longer discernible. Moreover, these dosimeters are not sensitive enough to epithermal neutrons, i.e. neutrons whose energy is higher than that of thermal neutrons but lower than a few hundred k.e.v. These medium-fast neutrons, however, form the greater part of the total radiation spectrum in the environment of nuclear reactors and may therefore form the main component of the radiation received by operators. Another disadvantage of these dosimeters is that the films can be used only once. This disadvantage is not shared by dosimeters based on thermoluminescence. If the sensitive material is heated after irradiation, then luminescence occurs and can be measured. The material is then suitable for use again and can be irradiated once more.

Sensitive materials that may be used in known thermoluminescent dosimeters include calcium fluoride (contaminated with manganese), which is sensitive to gamma radiation, and lithium fluoride, which is sensitive to thermal neutrons. But known thermoluminescent dosimeters are not suitable for showing fast and epithermal neutrons.

It has now been discovered that thermoluminescent dosimeters can be made suitable for showing epithermal and fast neutrons by adding lithium hydride to the sensitive material, which contains at least lithium fluoride. It has been found that fast neutrons can be liberated in this hydride by elastic collisions of energy-rich protons, which in their turn bring the lithium fluoride present into the activated state required for thermoluminescence. The lithium hydride added also acts as a moderator material, whereby the fast neutrons are slowed down to an energy at which they can bring the lithium fluoride into the desired activated state.

According to the invention a thermoluminescent radiation dosimeter has thermoluminescent radiation-sensitive material and is characterized by said radiation-sensitive material comprising a mixture containing grains of lithium fluoride and grains of lithium hydride.

A sensitive material is obtained by mixing lithium hydride and lithium fluoride in powder form. The lithium fluoride can be made more sensitive to thermal neutrons by enrichment of the lithium-6-isotope, the active neutron-capture cross section of which is greater than that of the lithium-7 isotope. On the other hand, Li$^7$F is more suitable for showing gamma radiation.

The grain size of the lithium hydride used affects the sensitivity of the dosimeter. The chance of recoil protons produced in the hydride by fast neutrons leaving the hydride grain and producing the desired effect in a neighboring fluoride grain in increased as the size of the grain lithium hydride is decreased. It is therefore preferable to use a lithium hydride with a small grain size.

This means that a sensitive material that shows a given part of the radiation spectrum can be made up by suitable choice of the starting materials. The quantity of LiF in the mixture generally determines the radiation sensitivity; the sensitivity to thermal neutrons increases with the amount of lithium-6 that is present. On the other hand, the sensitivity to epithermal and fast neutrons increases with the quantity of LiH. By the use of lithium-7 fluoride and in particular by shielding with cadmium or boron, the dosimeter can be made completely insensitive to thermal neutrons. On the other hand, it is naturally also possible to prepare a sensitive material that shows the whole radiation spectrum. Another possibility is to provide the dosimeter with a carrier on which the sensitive material is disposed in zones, each zone being sensitive to a given range of the total radiation spectrum.

The use of lithium hydride as an additive to lithium fluoride has various advantages. Since compounds of the same metal are involved here, there is little chance of their reacting with each other when they are heated as required in order to produce the luminescence phenomenon. Moreover, lithium-7 has moderator properties in itself, so that the probability that a fast neutron that has arrived at a LiH grain will cause the desired reaction becomes greater.

A disadvantage of the hydride is its reactivity, for example with water. It is therefore preferable to seal off the hydride from the air. This can be done by vapor-coating the lithium hydride grains with a thin layer of aluminum or, as the following example shows, designing the dosimeter so that the sensitive material is in an atmosphere of an inert gas, such as argon. If the lithium hydride grains are provided with a protective layer, they can be disposed on a carrier with the aid of media that contain water, such as water glass.

The drawings show an example of a dosimeter according to the invention.

Figure 2:
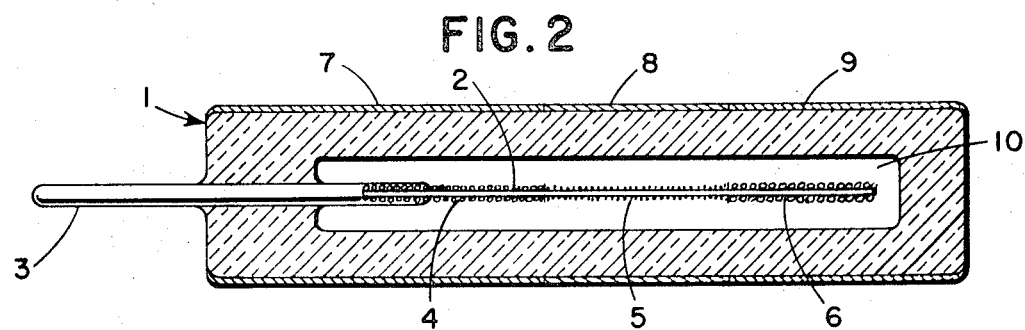
Figure 3:
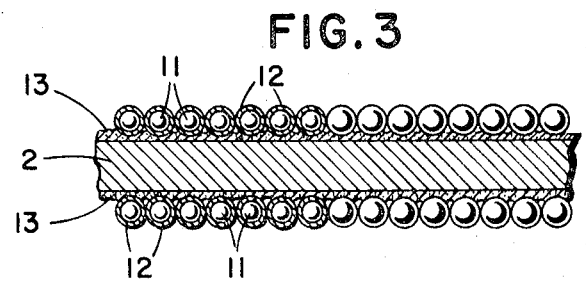

FIG. 1 is a plan view of the dosimeter according to the invention, partially in section; FIG. 2 is a longitudinal sectional view taken along line 2-2 of FIG. 1; FIG. 3 is an enlarged sectional view of a portion of the carrier foil and a number of lithium hydride grains which are coated with a moisture protective layer and cemented to the foil.

In the drawings, 1 is the body of the dosimeter, preferably made of potassium-free glass, for example boron glass. In this body a cavity 10 is hollowed out in which there is an inert gas atmosphere. In this cavity there is a carrier 2, which is preferably made of a material that can be heated electrically. The sensitive material is carried on the surface of this carrier. In a particularly advantageous embodiment according to the invention, the carrier consists of an electrically conductive foil, for example a nickel-chromium heating foil, on which connections 3 for the supply of current are disposed. To determine a radiation dose, this dosimeter is connected to a current source, so that the carrier is heated and luminescence occurs.

The quantity of radiated light can be determined after calibration with commercial apparatus adapted to integrate and record the light yield at a given heating speed.

The dimensions of the dosimeter may be small enough for it to be suitable for personal dosimetry and be able to be placed in the usual film holders with other dosimeters where required.

The dosimeter may be designed so that the sensitive material is distributed on the carrier in different zones, 4, 5 and 6 each of which is sensitive to a given type of radiation. Thus, one zone may be provided with the mixture of lithium hydride and lithium fluoride, another zone with the same mixture, but with a different ratio of the components, and another zone with lithium fluoride alone, with or without a shielding of cadmium or boron. With this distribution into zones, it is particularly advantageous to provide the dosimeter with one or more light-conductors as zones 7, 8 and 9 in the body 1 having different light transmission coatings preferably corresponding with the zones on carrier 2 so that the luminescence light obtained in one apparatus can be analyzed into that for each zone with the use of various photo diodes, amplifiers and the like.

This enables a picture to be obtained of the total radiation received, and also provides a general idea of the various types of radiation that have contributed to the total picture. The dosimeter may also be designed with the lithium hydride grains 11 (see FIG 3) having a coating 12 of a substance such as aluminum, these grains being adhered to the carrier 2 with an adhesive 13 such as water glass.

We claim:

1. A radiation dosimeter based on the phenomenon of thermoluminescence, the radiation dosimeter being provided with a radiation-sensitive material containing lithium fluoride and lithium hydride.

2. A radiation dosimeter as claimed in claim 1, wherein the radiation-sensitive material is disposed on a carrier that can be heated electrically.

3. A radiation dosimeter as claimed in claim 2, wherein the lithium hydride is shielded from the atmosphere by the disposition of the carrier in an inert gas atmosphere.

4. A radiation dosimeter as claimed in claim 2, wherein the sensitive material is disposed on the carrier in different zones, each of which zone has a specific sensitivity to a given type of radiation.

5. A radiation dosimeter as claimed in claim 4, and further comprising a plurality of light-conductors disposed so as to correspond with each zone.

6. A radiation dosimeter as claimed in claim 2, wherein the carrier consists of an electrically conductive foil on which are disposed connections for the supply of current.

7. A radiation dosimeter as claimed in claim 6, and further comprising a hermetic radiation-transparent envelope surrounding said carrier and said radiation-sensitive material and through which said connections pass, and an inert gas atmosphere within said envelope.

8. A radiation dosimeter as claimed in claim 1, wherein the lithium fluoride is enriched with the isotope lithium-6.

9. A radiation dosimeter as claimed in claim 1, and further comprising a radiation-transparent hermetically sealed coat on separate grains of the lithium hydride.

10. A radiation dosimeter as claimed in claim 9, wherein said coat is an aluminum hermetically sealed coat on separate grains of the lithium hydride.